US 6,704,696 B1

(12) United States Patent
Kuramochi et al.

(10) Patent No.: US 6,704,696 B1
(45) Date of Patent: Mar. 9, 2004

(54) APPARATUS FOR AND METHOD OF DESIGNING FLUID CONTROL DEVICES

(75) Inventors: Michio Kuramochi, Osaka (JP); Masayuki Hatano, Osaka (JP); Hiroshi Ogawa, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 09/354,099

(22) Filed: Jul. 15, 1999

(30) Foreign Application Priority Data

Jul. 17, 1998 (JP) .......................... 10/202907

(51) Int. Cl.$^7$ .............. G06G 7/48; G06G 7/50
(52) U.S. Cl. ............... 703/9; 703/12; 703/1; 702/12; 345/630; 364/146; 364/512
(58) Field of Search .............. 703/1, 9, 12; 702/12; 345/630; 364/146, 512

(56) References Cited

U.S. PATENT DOCUMENTS

| | | | |
|---|---|---|---|
| 4,315,315 A | | 2/1982 | Kossiakoff |
| 4,831,546 A | * | 5/1989 | Mitsuta .................. 703/1 |
| 4,855,939 A | * | 8/1989 | Fitzgerald ............... 345/419 |
| 5,168,441 A | | 12/1992 | Onarheim et al. |
| 5,347,466 A | * | 9/1994 | Nichols ................. 703/18 |
| 5,372,508 A | * | 12/1994 | Hautzenroder ............ 434/126 |
| 5,544,291 A | * | 8/1996 | Gilley .................. 345/423 |
| 5,576,946 A | * | 11/1996 | Bender ................. 700/17 |
| 5,625,798 A | | 4/1997 | Badders et al. |
| 5,684,713 A | * | 11/1997 | Asada .................. 716/19 |

FOREIGN PATENT DOCUMENTS

| DE | 42 12 370 | 10/1993 |
|---|---|---|
| WO | WO 97/12301 | 4/1997 |

OTHER PUBLICATIONS

Brooks Jr., Frederick P. Oct. 23, 1986, Interactive 3D Graphics. p15, A Dynamic Graphics System for Simulating Virtual Bldg.*

"An Intellignet Dynamic simulation Environment" J.T. Robinson, Oak Ridge National Laboratory, IEEE 0–8186–2012–9–89/0000/0687, 1989.*

* cited by examiner

*Primary Examiner*—Kevin J. Teska
*Assistant Examiner*—Fred O Ferris, III
(74) *Attorney, Agent, or Firm*—Armstrong, Kratz, Quintos, Hanson & Brooks, LLP (57) ABSTRACT

A designing apparatus comprises symbol mark memory for storing fluid controllers usable in fluid control devices in terms of symbol marks representing the functions, fluid channels and contours of the controllers, and a flowchart preparing device for preparing a flowchart of a fluid control device represented by symbol marks. The flowchart preparing device successively selects controllers, such as valves and massflow controllers, from a symbol mark file in the memory, arranges the selected controllers on a screen as suitably positioned, automatically selects a suitable coupling member for interconnecting adjacent two of the controllers from a coupling member data file and automatically arranges te controllers and the coupling members thus selected to prepare a flowchart.

5 Claims, 7 Drawing Sheets

APPARATUS FOR AND METHOD OF DESIGNING FLUID CONTROL DEVICES

BACKGROUND OF THE INVENTION

The present invention relates to a designing apparastus and a designing method for use in designing fluid control devices which are useful, for example, for systems for fabricating semiconductors.

Fluid control devices are already known which are obtained by connecting a plurality of fluid controllers by a plurality of coupling members. Such a fluid control device is designed by preparing a plan view (see FIG. 7) of the actual fluid control device with reference to a flowchart (see FIG. 6) showing the component fluid controllers and connections thereof, then determining the coupling members required for interconnecting these controllers and thereafter preparing a list of components of the device and an estimate of the device.

Figure 6:
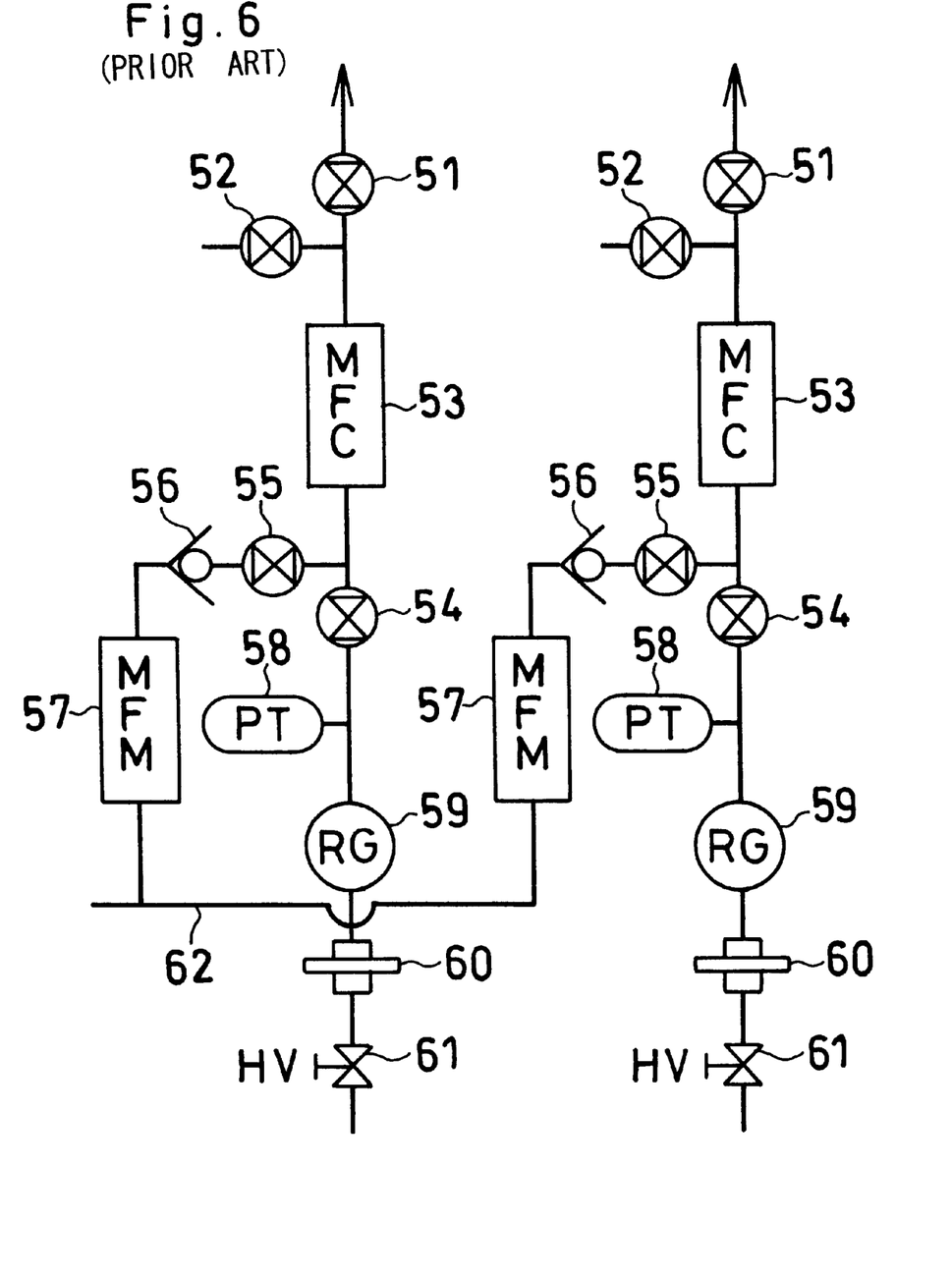
FIG. 6 is a flowchart of a fluid control device which chart is provided by the process designer of the device.

With reference to FIG. 6, indicated at 51, 52, 54, 55 are on-off valves, at 53 massflow controllers (MFCs), at 56 check valves, at 57 massflow meters (MFMs), at 58 pressure sensors (PTs), at 59 pressure regulators (RGs), at 60 filters, at 61 manual valves (HVs), and 62 connecting piping between adjacent lines.

Figure 7:
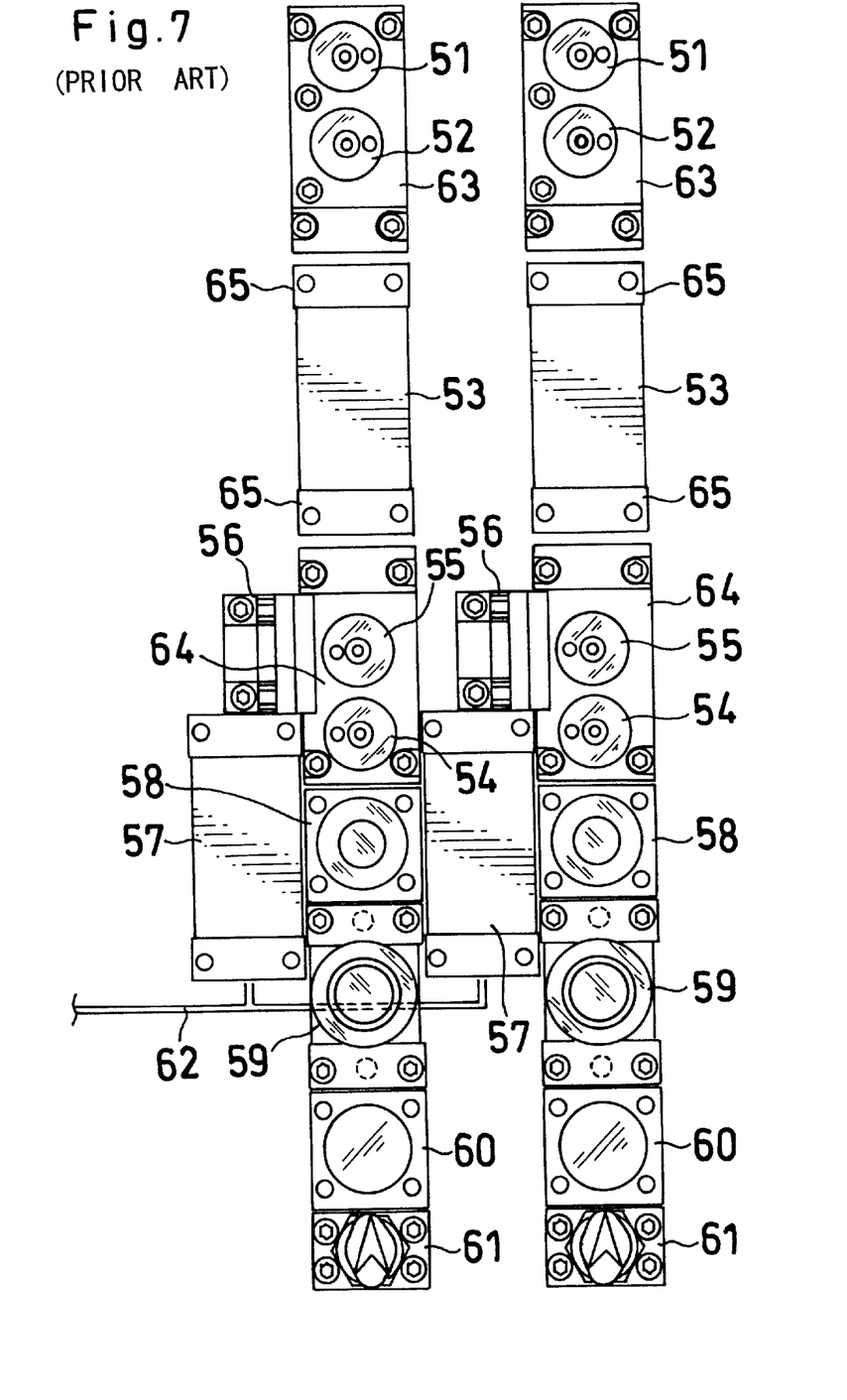
FIG. 7 is a plan view showing an example of fluid control device corresponding to FIG. 6.

In FIGS. 6 and 7, like parts are designated by like reference numerals 51 to 62. For example in FIG. 7, the pair of on-off valves 51, 52 (54, 55) provided at the inlet (outlet) side of the massflow controller 53 are mounted on a single block 63 (64) and handled as a single component. Block couplings 65, 65 are attached respectively to the inlet side and outlet side of the massflow controller 53 to ensure facilitated connection to blocks 63, 64 adjacent to the controller. Thus, contrivances are added to the flowchart of FIG. 6 to show the actual fluid control device.

The two kinds of drawings will be described in detail. Although the fluid channels are apparent from the flowchart of FIG. 6 which is provided by the customer who is to use the fluid control device, no consideration is given to the drawing as to the sizes of the components or the spaces between adjacent members. On the other hand, FIG. 7 which is a plan view of the fluid control device prepared by the designer of the device shows the sizes of the components and the spacings between the adjacent members, whereas the drawing fails to clearly show the fluid channels through the components to the customer, and the worker who is to fabricate or inspect the device. Furthermore, much time and labor are required for determining the particular coupling members to be used or preparing a list of components of the device and an estimate thereof with reference to FIG. 7, and the procedures involved are very likely to permit occurrence human errors.

SUMMARY OF THE INVENTION

An object of the present invention is to provide an apparatus for designing fluid control devices which makes it possible to prepare a flowchart showing not only the fluid channels but also the sizes of components or members and the spacings between the adjacent members.

Another object of the invention is to provide an apparatus for designing fluid control devices which is adapted to automatically prepare a three-dimensional assembly drawing of the fluid control device.

Another object of the invention is to provide an apparatus for designing fluid control devices which assures reduced time and labor in preparing a list of components of the device and an estimate thereof and which is adapted to eliminate the human errors to be involved in the preparation procedures.

Still another object of the invention is to provide a method of designing fluid control devices with a remarkably improved efficiency.

The present invention provides an apparatus for designing by a programmed computer a fluid control device to be obtained by connecting a plurality of fluid controllers by a plurality of coupling members, the apparatus comprising symbol mark memory means for storing fluid controllers usable in fluid control devices in terms of symbol marks representing the functions, fluid channels and contours of the controllers, instruction means for arranging the combination of symbol marks of the fluid controllers for use in the fluid control device to be designed, and a flowchart preparing means for preparing a flowchart of the fluid control device represented in symbol marks by the instruction means.

Examples of fluid controllers are monofunctional members such as massflow controllers, on-off valves, check valves, pressure regulators, filters, massflow meters and pressure sensors; a unit of two monofunctional members (for example, two on-off valves, or a filter and a pressure sensor) as mounted on a single block; and the assembly of a monofunctional member (such as a massflow controller) and a coupling member attached to each side of the member.

Preferably, the coupling member to be used is a so-called block coupling which is a rectangular parallelepipedal block formed with a communication fluid channel, whereas couplings other than block couplings are usable insofar as they are adapted to connect the fluid channels of fluid controllers.

Fluid control devices are obtained by connecting a plurality of fluid controllers by a plurality of coupling members. It is desirable to arrange the fluid controllers at an upper stage and the coupling members at a lower stage. In this case, the coupling members of lower stage are fastened to a base plate of aluminum or the like with screws, and each fluid controller of upper stage is fastened with screws to adjacent two of the coupling members like a bridge.

The symbol mark is such that for example, a controller, such as a valve, which is given a JIS designation is assigned a symbol mark comprising the JIS designation and an indication of the fluid channel and contour thereof. The massflow controller which has no JIS designation is given a symbol mark comprising an abbreviation or acronym, such as MFC, and an indication of the fluid channel and contour thereof. The contour is expressed in terms of the size in plan view. In the case where a controller differs from those of the same type only in fluid channel or in length, the controller is handled as another fluid controller, that is, it is referred to by a different symbol mark. Each fluid controller is assigned a suitable item number, the item number and the symbol mark thereof are used in a pair, and many such pairs are stored in the symbol mark memory means.

The specifications of the desired fluid control device are presented in the form shown in FIG. 6 by the process designer of the control functions of the device, while the fabrication designer of the device inputs into the designing apparatus the item number of each of the controllers having the corresponding control functions while giving consideration to various design factors, for example, as to whether two on-off valves are to be composed of two members, whether two on-off valves are to be provided by a single member as a unit, whether two adjacent valves are to be interconnected by welding a tube thereto, or whether two adjacent valves are to be interconnected by a block coupling. When the item number of a particular control device is input, the corresponding controller symbol mark is displayed on the screen of the apparatus. The fabrication designer affixes such symbol marks to the screen successively at specified positions to prepare a flowchart. Since the flow chart shows not only the functions of the component fluid controllers but also the fluid channels and contours thereof by symbol marks, the functions, fluid channels and sizes of the members to be used in the fluid control device are all manifestly shown.

Preferably, the designing apparatus further comprises controller data memory means for storing data as to the fluid controllers usable in fluid control devices, coupling member data memory means for storing data as to coupling members usable in fluid control devices, coupling member selecting means for selecting from the coupling member data memory means the coupling members required for connecting said plurality of fluid controllers with reference to the flowchart prepared, and assembly drawing preparing means for retrieving three-dimensional data as to the fluid controllers and the coupling members for use in the fluid control device to be designed from the corresponding memory means and preparing a three-dimensional assembly drawing of the fluid control device to be designed.

The data as to the fluid controllers and the coupling members includes the three-dimensional sizes of contours thereof (maximum values of length, width and height of each of these components and other required values) and the plan-view sizes of the fluid channels thereof (length of each fluid channel and the position of each opening of the channel from the reference value), and further includes weights, pressure loss and flow rate as reference values.

For example in the case where a block coupling having a V-shaped channel is to be used, the minimum distance between openings of the two fluid controllers to be interconnected by the block coupling is obtained from the controller data memory means, and different kinds of block couplings usable for connecting the controllers can be found from the coupling member data memory means on condition that the coupling should be greater than the minimum distance. The different kinds are displayed on the screen, enabling the fabrication designer to select a suitable coupling while giving consideration to other specifications of the fluid control device; for example, there may be a need to shorten the overall length of the device, or a need may arise to match the adjacent fluid controllers in position.

In this way, the required fluid controllers are determined one after another to select suitable coupling members, whereby all the members to be used in the fluid control device are determined. An assembly drawing of the device can be obtained by making these fluid controllers and coupling members three-dimensional using three-dimensional data stored in the corresponding data memory means. The drawings for use in fabricating the fluid control device, list of the component members and estimate can be automatically prepared with reference to the assembling drawing. The list of component members and the estimate thus obtained are free of the omission of any member or errors due to manual work and usable as highly reliable documents.

The present invention further provides a method of designing by a programmed computer a fluid control device to be obtained by connecting a plurality of fluid controllers by a plurality of coupling members, the method including the step of storing fluid controllers usable in fluid control devices in terms of symbol marks representing the functions, fluid channels and contours of the controllers, the step of arranging the combination of symbol marks of the fluid controllers for use in the fluid control device to be designed, and the step of preparing a flowchart of the fluid control device represented by the symbol marks.

Since the flow chart thus prepared shows not only the functions of the component fluid controllers but also the fluid channels and contours thereof by symbol marks, the functions, fluid channels and sizes of the members to be used in the fluid control device are all manifestly shown.

Preferably, the designing method further includes the step of storing data as to the fluid controllers usable in fluid control devices, the step of storing data as to coupling members usable in fluid control devices, the step of selecting the coupling members required for connecting said plurality of fluid controllers with reference to the flowchart prepared, and the step of retrieving three-dimensional data as to the fluid controllers and the coupling members for use in the fluid control device to be designed and preparing a three-dimensional assembly drawing of the fluid control device to be designed.

The assembly drawing thus prepared manifestly shows the fluid control device in its entirety and further makes it possible to automatically prepare the drawings for use in fabricating the device, list of the component members and estimate of the device with reference to the drawing, consequently achieving a greatly improved efficiency in designing the device.

DESCRIPTION OF THE REFERRED EMBODIMENTS

Embodiments of the invention will be described with reference to the drawings.

Figure 1:
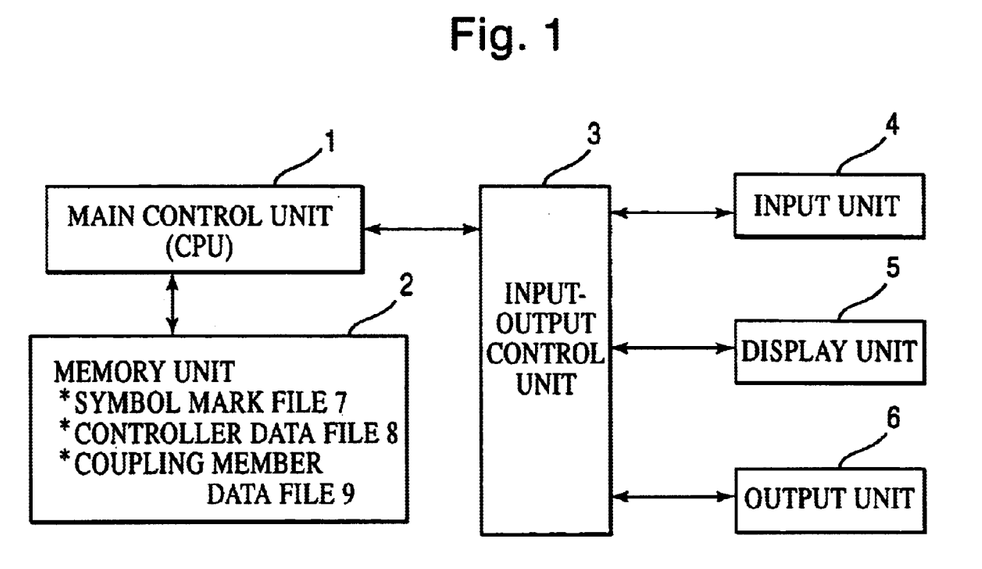
FIG. 1 is a diagram showing the construction of hardware of an apparatus embodying the invention for designing fluid control devices.

The invention provides an apparatus for designing by a programmed computer a fluid control device which is obtained by connecting a plurality of fluid controllers by a plurality of coupling members. As shown in FIG. 1, the hardware of the apparatus comprises a main control unit 1, memory unit 2, input-output control unit 3, input unit 4, display unit 5 and output unit 6. The memory unit 2 has stored therein symbol marks 7 representing the functions, fluid channels and contours of fluid controllers which can be used in fluid control devices, data 8 as to the fluid controllers usable in fluid control devices, and data 9 as to coupling members which can be used in fluid control devices. The controller data 8 and the coupling member data 9 comprise the three-dimensional size of contour of each controller or coupling member (maximum values of length, width and height of each and other required values) and the plan-view size of the fluid channel thereof (length of the fluid channel and the position of each opening of the channel from a reference value).

Figure 2:
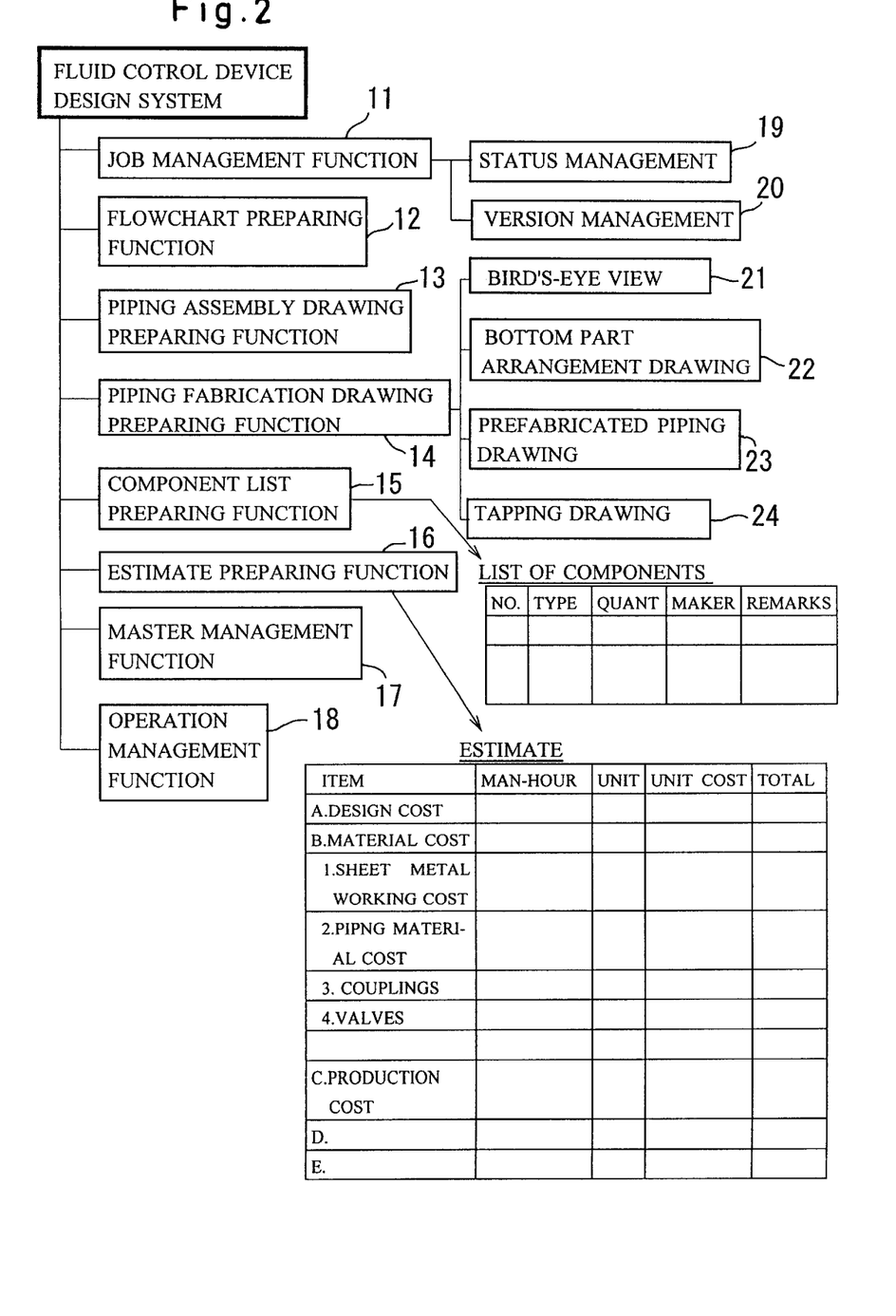
FIG. 2 is a block diagram showing the functions of the apparatus of the invention.

FIG. 2 is a functional block diagram of a system comprising the designing apparatus of the invention. As illustrated, the designing system has eight functions, i.e., a JOB management function 11, flowchart preparing function 12, piping assembly drawing preparing function 13, piping fabrication drawing preparing function 14, component list preparing function 15, estimate preparing function 16, master management function 17 and operation management function 18.

The JOB management function 11 performs JOB status management 19 and version management 20. The status management 19 supervises the progress (status) of tasks (JOB) including flowchart preparation through preparation of an estimate using JOB identifying keys for customer item number, supervisor, process name and number, and flowcart number. The task status includes three stages of "under study," "provisional" and "determined" and can be manually modified by the JOB processing worker only, whereby the revision of tasks is supervised to ensure execution of the work as desired. The version management 20 supervises the progress (version) of the individual tasks including the preparation of the flowchart through the preparation of the estimate in JOB units, making possible confirmation of version, new registration, duplication registration and deletion in JOB units.

The flowchart preparing function 12 prepares a flowchart by successively affixing the symbol marks of fluid controllers registered in advance in the symbol mark file 7 of the memory unit 2, on the screen at specified positions with reference to the fabrication specifications presented by the process designer of the desired flow control device. Incidentally, there are two kinds of flowcharts: a flowchart presented by the process designer of the fluid control device, and a flowchart prepared by the designing apparatus of the invention. The former will be referred to as the "original flowchart," and the latter merely as "flowchart."

Figure 3:
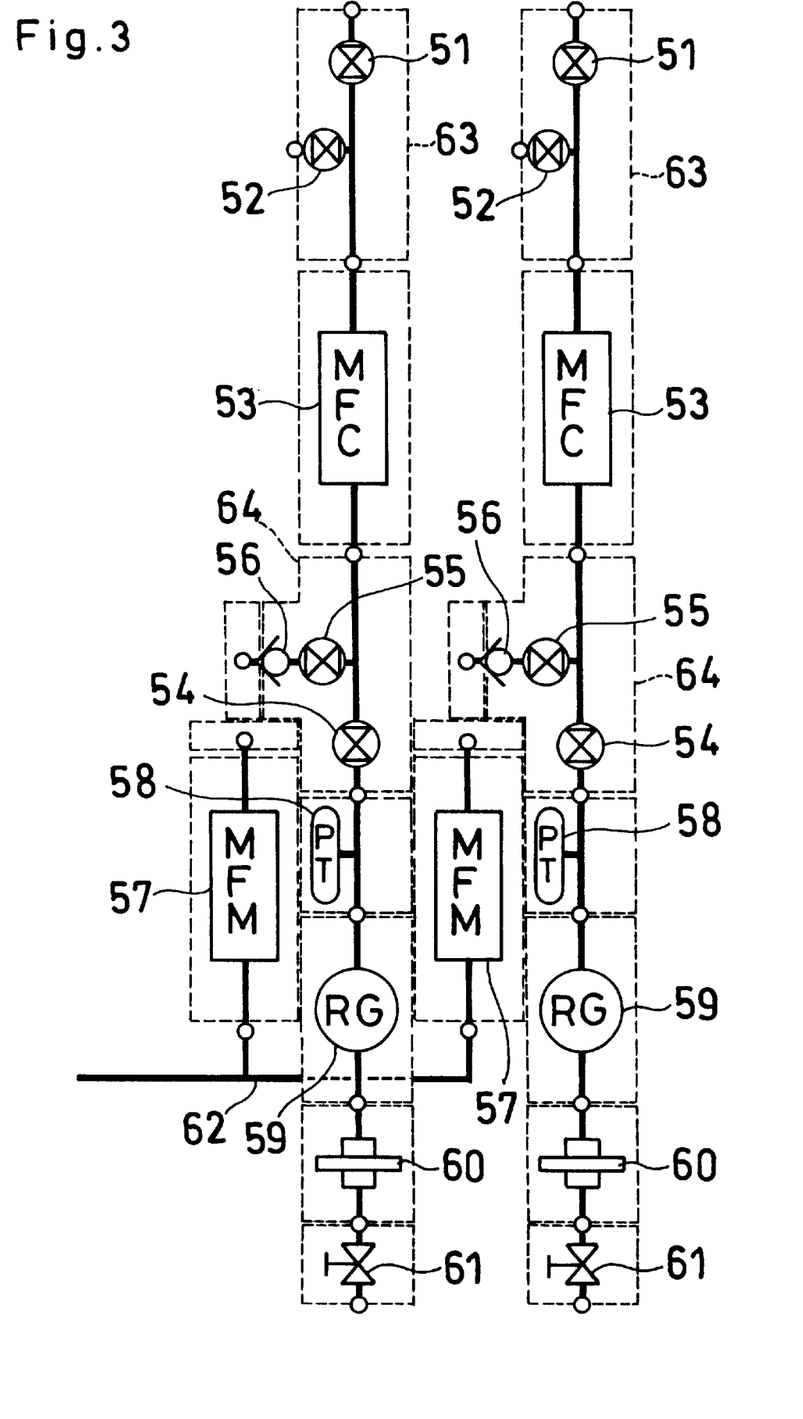
FIG. 3 is a flowchart of a fluid control device, as converted from the flowchart of FIG. 6 by the designing apparatus of the invention.

FIG. 3 shows the flowchart. In FIG. 3 and the original flowchart of FIG. 6, like parts are designated by like reference numerals 51 to 62. The graphic symbols or character symbols represent the names (functions) of fluid controllers. In FIG. 3, the broken-line frames indicate the actual sizes of the fluid controllers as they are seen from above (i.e., plan-view sizes), and the spacings between the controllers are indicated in actual values. Accordingly, the frames can be registered with the contour lines of the components shown in solid lines in FIG. 7. Further the thick lines represent fluid channels, and the blank circles at the ends of each line represents fluid channel openings (ports). For example, FIG. 3 shows that a pair of on-off valves 51, 52 (54, 55) provided at the inlet (outlet) side of a massflow controller 53 are mounted on a single block 63 (64) and handled as a single component, It is also seen that a fluid channel extending from one of the on-off valves 51 (54) to the massflow controller 53 branches out into a fluid channel leading to the other on-off valve 52 (55), and that this branch channel is opened laterally of the device directly or via a check valve (56). It is further seen that block couplings 65, 65 (FIG. 7) arranged at the inlet and outlet sides of the massflow controller 53 are indicated as contained in the overall size of the massflow controller 53. FIG. 3 not only shows the fluid channels of the fluid control device but also indicates the actual sizes of the fluid controllers and is a drawing which is free of both the drawback of FIG. 6 and that of FIG. 7.

Figure 4:
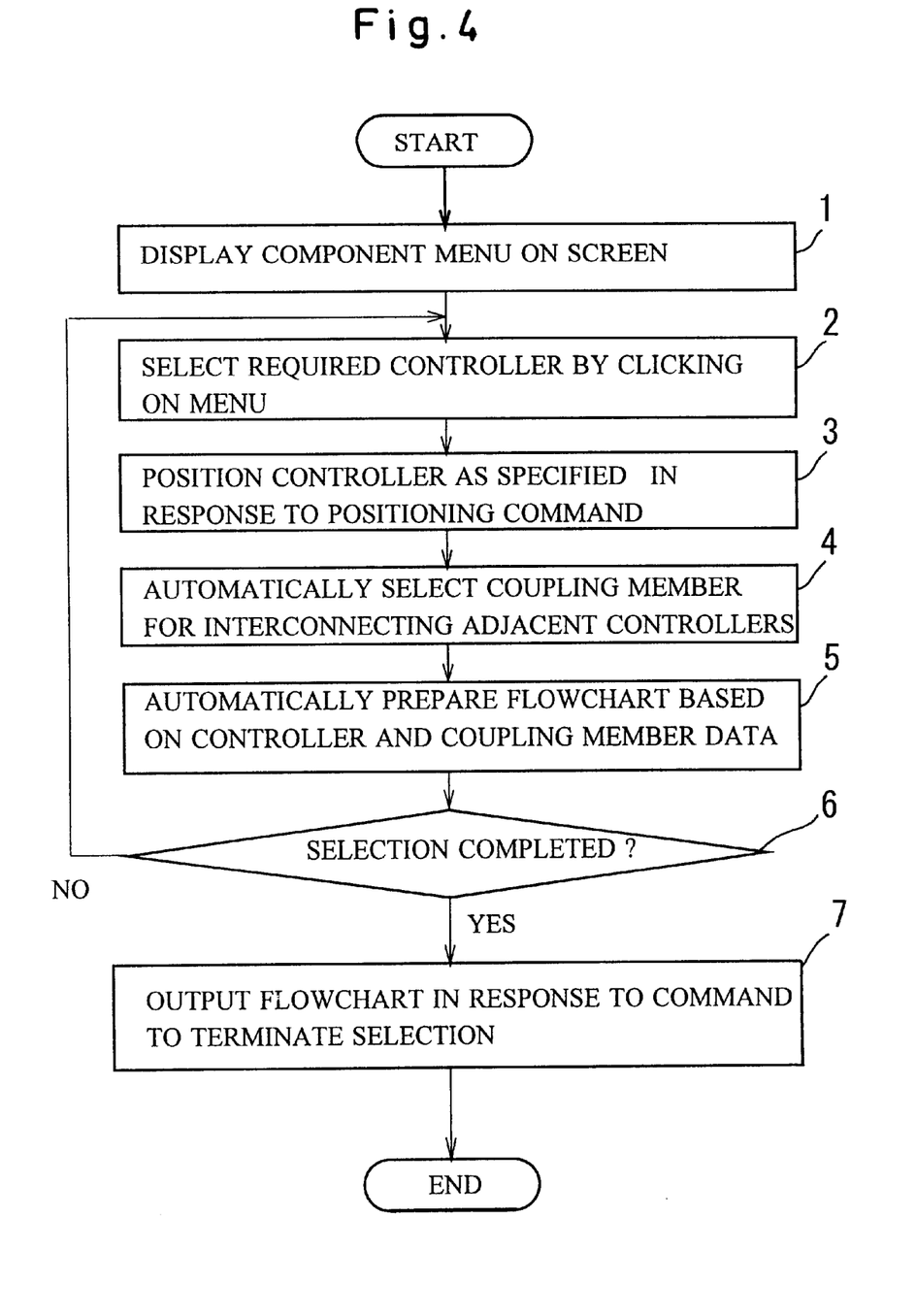
FIG. 4 is a flowchart showing a procedure for preparing a flowchart.

FIG. 4 shows a specific procedure for preparing a flowchart. This procedure corroborates with explanations as shown in FIG. 1. When the flowchart preparing function 12 is selected, a controller menu is displayed on the screen (step 1). The fabrication designer can select valves, massflow controllers or the like controllers one after another from the symbol mark file 7 in the memory unit 2 by clicking on the controller menu (step 2). The controller selected is located at a desired point on the screen or at a suitable position based on a reference point within another controller, for example, by moving the mouse (step 3). The plan-view sizes of the positioned controller and another controller adjacent thereto are retrieved from the fluid controller data file 8 in the memory unit 2, and a suitable coupling member for interconnecting these controllers is automatically selected from the coupling member data file 9 (step 4). The controller and the coupling member are automatically arranged in accordance with the plan-view sizes thereof to progressively automatically prepare a flowchart of the fluid control device (step 5). Steps 2 to 5 provide flowchart preparing means and are repeated until a command to terminate selection (step 6) is given. When this command is given (step 6), a sequence of flow chart preparing steps is completed. The flowchart prepared is delivered by the output unit (for example, plotter) 6.

The coupling member selecting step 4 described performs the procedure that when the controller is disposed adjacent to another controller already positioned in place, the block contours of the two controller are identified, and a corresponding coupling member is selected. The coupling member is expressed, for example, by an item number such as VL14, VL20 or VL27 wherein the number corresponds approximately to the opening-to-opening distance. Usually different kinds of coupling members are available for interconnecting the two controllers. With consideration given to other requirements, the fabrication designer selects a suitable member from among these to design the fluid control device meeting the performance requirement. Upon the selection of the coupling member, the selected coupling member is automatically depicted adjacent to the controller which has already been positioned in place, and the next controller is automatically depicted as positioned at the other point of installation on the coupling member.

In preparing the flowchart, the item numbers in combination with the symbol marks are handled as serial designations in the flowchart. The symbol marks of the massflow controllers, pressure regulators and filters can be selected only from a "gas name-flow rate" relationship matrix which is prepared in advance.

The piping assembly drawing preparing function 13 automatically prepares a piping assembly drawing in actual size with reference to the flowchart by replacing the symbol marks and coupling members with three-dimensional devices registered in advance, using MDT function. The piping assembly drawing prepared is output to a plotter. The piping assembly drawing can be prepared only when the task status of flowchart preparation is "provisional" or "determined."

Figure 5:
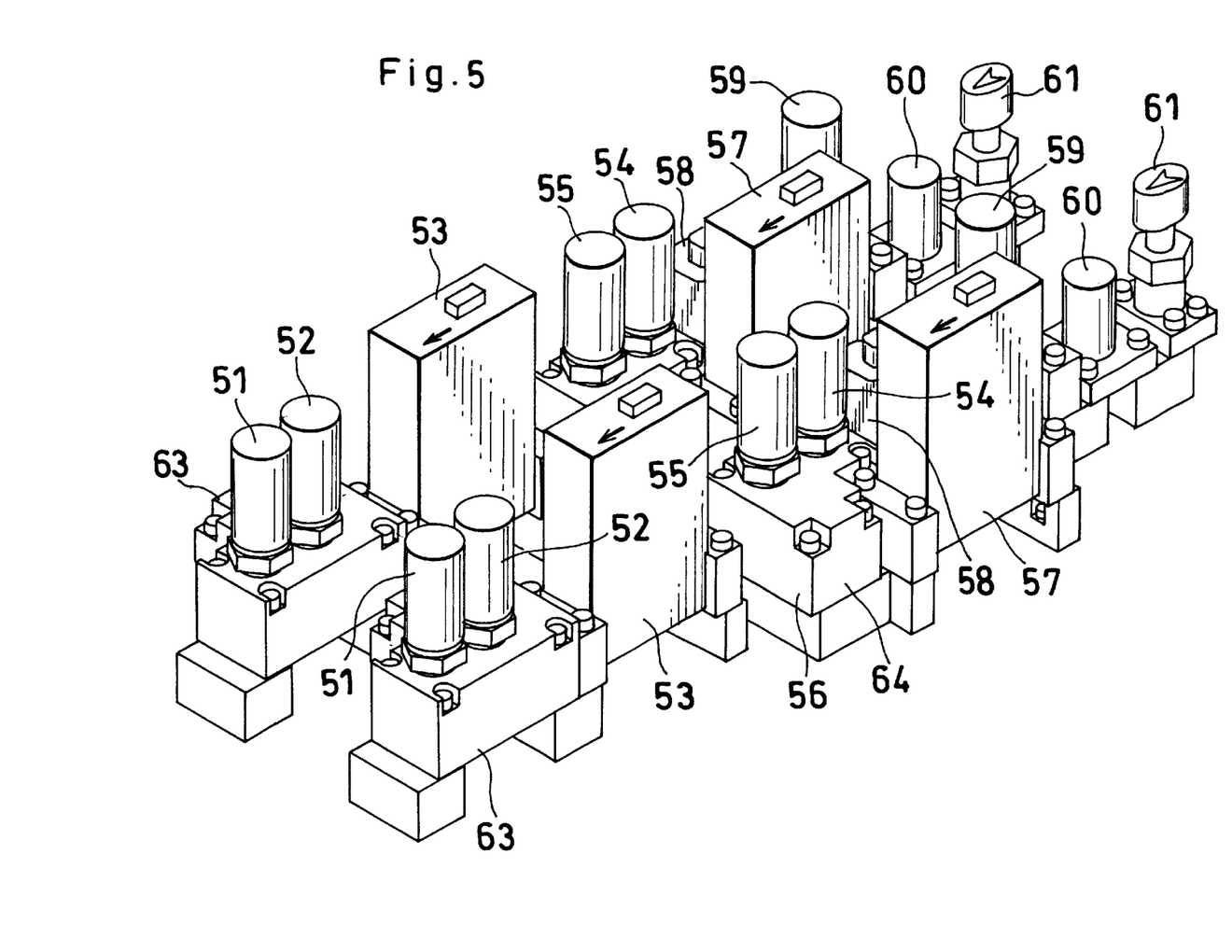
FIG. 5 is a three-dimensional view of the fluid control device which view is obtained based on the flowchart thus prepared.

The piping fabrication drawing preparing function 14 automatically prepares a bird's-eye view 21, bottom part arrangement drawing 22, prefabricated piping drawing 23, tapping drawing 24, etc. by capturing the piping assembly drawing. FIG. 5 shows an example of bird's-eye view 21 which is obtained by subjecting the piping assembly drawing to hidden-line processing. Throughout FIGS. 3, 5, 6 and 7, like parts are designated by like reference numerals. In preparing the bird's-eye view thus processed, parts are to remain unremoved even if they are partly or wholly erased, while it is required that the item numbers in combination with the symbol marks given in the flowchart be indicated. In addition to the coupling members, gaskets, bolts, pipes and weld joints are shown in a plan view in the drawing 22. The prefabricated piping drawing 23 is prepared as a three-dimensional drawing of the region input for the range of the bottom part arrangement drawing 22. In preparing the drawing, the start position on the screen is to be indicated. The tapping drawing 24 is prepared as a two-dimensional drawing showing only the positions of tapping for fastening the coupling members. The data as to the tapping positions is edited for designing the base plate (sheet metal).

The component list preparing function 15 automatically prepares a list of individual components (parts) from the flowchart and the piping assembly drawing. A component list of outside products only is prepared from the flowchart, and the list of all members is prepared from the piping assembly drawing in a required format. The component list can be prepared from the flowchart only when the task status for the flowchart is "provisional" or "determined." The header information of the component list can be input manually, while it is made impossible to modify the automatically prepared portion thereof. The component list thus prepared can be output to a printer.

The estimate preparing function 16 automatically prepares estimates from the flow chart and the piping assembly drawing, respectively. An approximate prompt estimate is prepared from the flowchart, and a fabrication estimate or comprehensive estimate (see FIG. 2, "ESTIMATE") from the piping assembly drawing. The approximate prompt estimate can be prepared from the flowchart only when the task status for the flowchart is "provisional" or "determined." The data remaining to be added to the estimate can be input manually, while it is made impossible to modify the automatically prepared portion thereof. The estimate thus prepared can be output to the printer.

The master management function 17 effects overall maintenance, while the operation management function 18 performs backup and restoring operations, takes countermeasures against troubles, assures security and manages programs for transition to fabrication, etc.

Graphical User Interface (GUI) is used in the present system for designing fluid control devices, and the software used for OS is WindowsNT Server and WindowsNT Workstation. To give the system the function of automatically arranging the bottom parts and the function of automatically developing a plan view into a three-dimensional view, AutoCAD Mechanical Desktop 2.0 is used as the basic tool. Fabrication instructions, original flowchart, component list and modifications of such documents are sent from the process designer to the fabrication designer by e-mail. Delivery specifications, design instructions, modification instructions, CAD data, piping assembly drawing, piping fabrication drawing, sheet metal drawing, estimates, etc. are sent from the fabrication designer to the process designer also by e-mail. Information relating to components or parts and design is handled by Oracle DBMS (database management system) for common use of the data.

What is claimed is:

1. An apparatus for using a programmed computer to design a fluid control device by connecting a plurality of fluid controller by a plurality of coupling members, the apparatus comprising symbol mark memory means for storing fluid controllers usable in fluid control devices in terms of symbols marks representing a plurality of functions, fluid channels and contours of the controllers, instruction means for arranging the combination of symbol marks of the fluid controllers for use in the fluid control device to be designed, and a flowchart preparing means for preparing a flowchart showing the flow of fluids of the fluid control device represented in symbol marks by the instruction means;

controller data memory means for storing data as to the fluid controllers usable in fluid control devices, coupling member data memory means for storing data as to coupling members usable in fluid control devices, coupling member selecting means for selecting from the coupling member data memory means the coupling members required for connecting said plurality of fluid controllers with reference to the flowchart prepared, and assembly drawing preparing means for retrieving three-dimensional data as to the fluid controllers and the coupling members for use in the fluid control device to be designed from the corresponding memory means and preparing a three-dimensional assembly drawing of the fluid control device to be designed.

2. A designing apparatus according to claim 1 which further comprises a component list preparing means for preparing a list of components of the fluid control device to be obtained, with reference to the assembly drawing prepared.

3. A designing apparatus according to claim 1 which further comprises estimate preparing means for preparing a statement of estimates of the fluid control device to be obtained, with reference tot he assembly drawing prepared.

4. A designing apparatus according to claim 1, wherein the data as to the fluid controllers and the coupling members includes the three-dimensional sizes of contours thereof and the plane-view sizes of the fluid channels thereof.

5. A method of using a programmed computer to design a fluid control device to be obtained by connecting a plurality of fluid controllers by a plurality of coupling members, the method including a step of storing fluid controllers usable in fluid control devices in terms of symbol marks representing a plurality of functions, fluid channels and contours of the controllers, the step of arranging the combination of symbol marks of the fluid controllers for use in the fluid control device to be designed, and a step of preparing a flowchart of the fluid control device represented by the symbol marks;

storing data as to the fluid controllers usable in fluid control devices, the step of storing data as to coupling members usable in fluid control devices, the step of selecting the coupling members required for connecting said plurality of fluid controllers with reference to the flowchart prepared, and the step of retrieving three-dimensional data as to the fluid controllers and the coupling members for use in the fluid control device to be designed and preparing a three-dimensional assembly drawing of the fluid control device to be designed.

* * * * *